Figure 2:
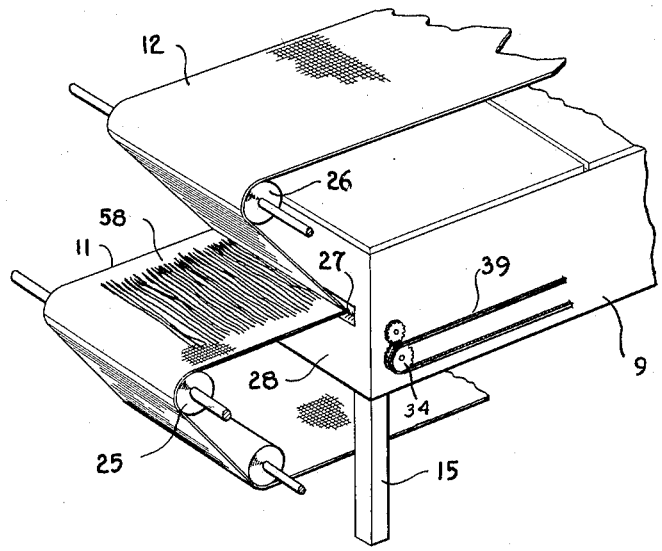

April 1, 1952
E. T. HODGE
2,591,069
METHOD OF CONTINUOUSLY DIGESTING AND DRYING FLAX STRAW
Filed Aug. 31, 1945
4 Sheets-Sheet 1
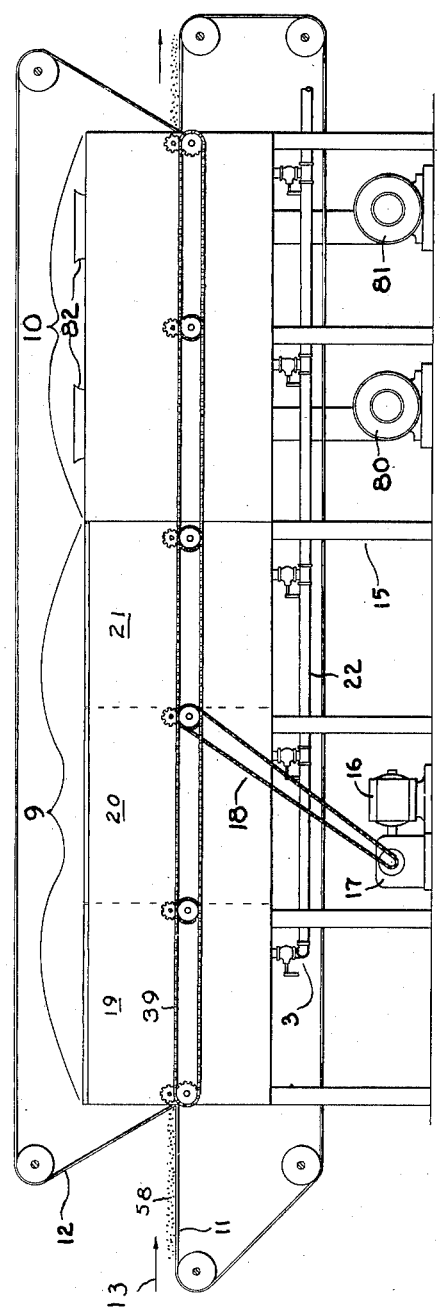
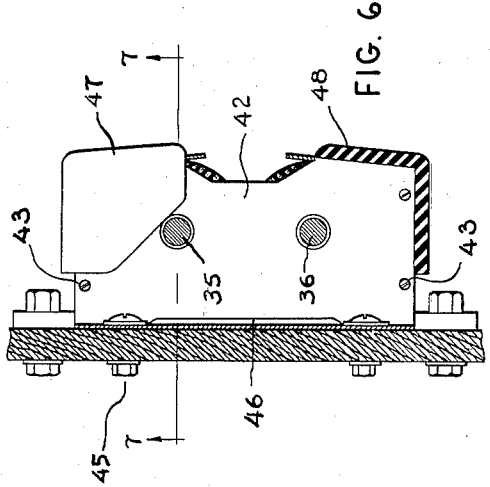
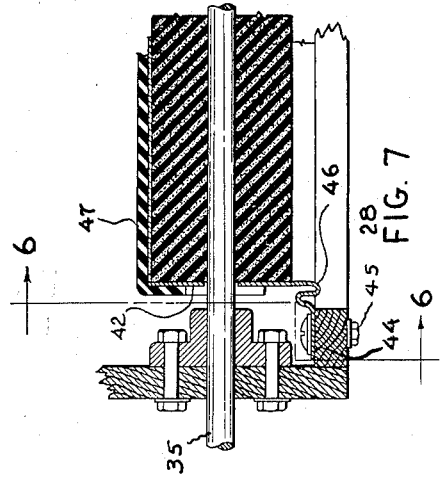
EDWIN T. HODGE
INVENTOR.
BY *E. A. Buckhorn*
ATTORNEY April 1, 1952     E. T. HODGE     2,591,069
METHOD OF CONTINUOUSLY DIGESTING
AND DRYING FLAX STRAW Filed Aug. 31, 1945     4 Sheets-Sheet 2

EDWIN T. HODGE
*INVENTOR.*

BY *E. A. Burnham*
*ATTORNEY*

EDWIN T. HODGE
INVENTOR.

BY E. A. Buchanan
ATTORNEY

Patented Apr. 1, 1952

2,591,069

UNITED STATES PATENT OFFICE 2,591,069

METHOD OF CONTINUOUSLY DIGESTING AND DRYING FLAX STRAW

Edwin T. Hodge, Portland, Oreg.

Application August 31, 1945, Serial No. 613,797

2 Claims. (Cl. 92—10)

This invention relates to methods and apparatus for treating fibrous and other materials and, though it is not necessarily limited thereto, the invention is particularly applicable for treating flax straw.

The treatment of flax straw following the harvesting thereof is concerned with the matter of separation of the flax fibers from the remaining components of the straw and which treatment, according to presently prevailing methods, involves the retting of the straw by immersing it in stagnant water over a prolonged period to permit microbic action upon the pectinous substances of the straw whereby the fiber is rendered more readily separable from the shove. Following such retting, the flax straw must be washed in order to remove mud, sand and other foreign matter and then it must be dried before it is subjected to the scutching operation. The drying is usually accomplished by placing the straw in the open and after it has been dried by the sun and wind it is piled up and stored until such time as the straw may be scutched. This procedure requires many handling operations and much time and consequently it is prohibitively costly in localities where high wage scales prevail.

Considerable thought and effort have been devoted toward the development of new methods and handling machinery but such processes and apparatus as have been thus far proposed have generally been designed for carrying out the principles of the old basic process. As distinguished from the prior art, the present invention is not concerned with any process which involves retting by microbic action and, in fact, it is a primary object of the present invention to eliminate, insofar as may be possible, any living organisms in the treatment of the straw and to render it substantially sterile as well as to render it free from any acids or any other deleterious compounds.

It is a further object of the present invention to provide a new and improved method whereby the flax straw as harvested from the field may be treated in a single operation and placed in condition for scutching, the total time for the treatment being but a matter of minutes as compared with months required by prior art procedures.

A still further object of the present invention is to provide a new and improved method for treating flax straw which does not require any microbic action and by means of which method the flax fiber is substantially freed from the shove under conditions inhibitory toward bacterial development.

A still futher object of the present invention is to provide a new and improved apparatus designed particularly for carrying out the method referred to above.

More specifically it is a further object of the present invention to provide a new and improved apparatus for treating, washing, cleansing and drying flax straw or the like materials.

Flax straw and similar fibrous vegetation of a pectocellulose nature has a bark consisting of an outer or cuticle layer, then an epidermis with a cortex in the center. Within the epidermis are bundles of fibers which are held together by soft walled cells and which cells also cement the various component parts of the straw firmly together. The cells are composed of a pectic substance comprised principally of pectin, pectic acid and protopectin. The fiber bundles have some seven of the above compounds serving as the material of the cells cementing the fibers together but the central lamella of the fibers is composed mainly of a salt of pectic acid. The woody portion of the straw including the core is composed of cellulose and while it is insoluble in water certain of the pectin substances making up the binder of the straw are water soluble. Pectin is a water soluble methyl ester of pectic acid while pectic acid is only slightly soluble in water. Protopectin as well as the calcium and magnesium salts of pectic acid are insoluble in water. The present invention depends upon the solubility of the pectinous binder material of the straw rather than upon its destruction by bacterial action. I have discovered that by boiling the flax straw in water the bundles of fibers may be freed from the cuticle and epidermis on the outside and from the woody core on the inside while the bundles of fibers themselves are not broken down. Flax straw cannot be simply boiled in water to accomplish the desired result but such treatment can be satisfactorily carried out only under certain conditions which will be pointed out with greater particularity herein. A more detailed description of the method of the invention will be made together with the description of the apparatus illustrated in the accompanying drawings.

Figure 3:
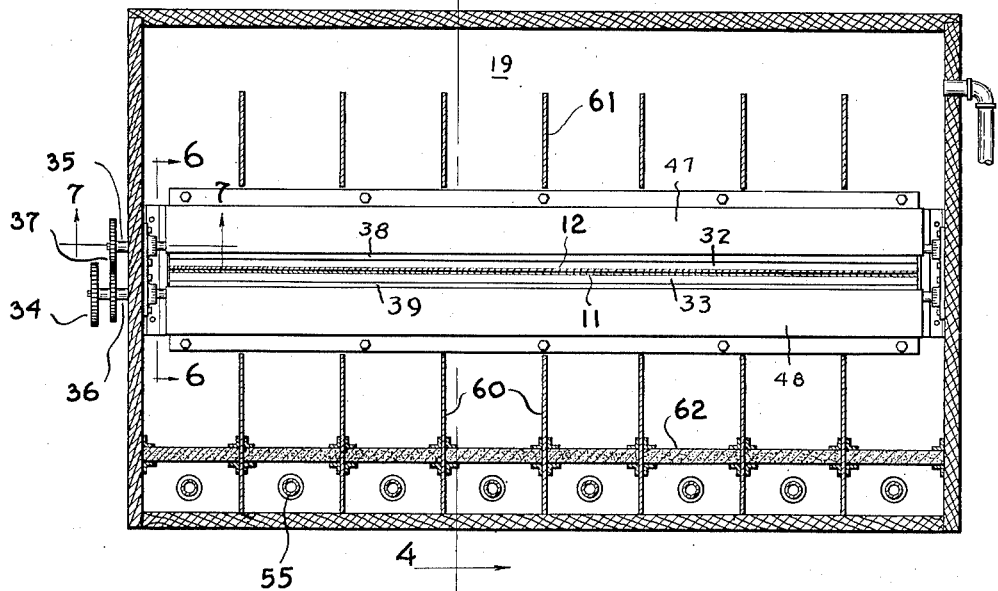
Figure 4:
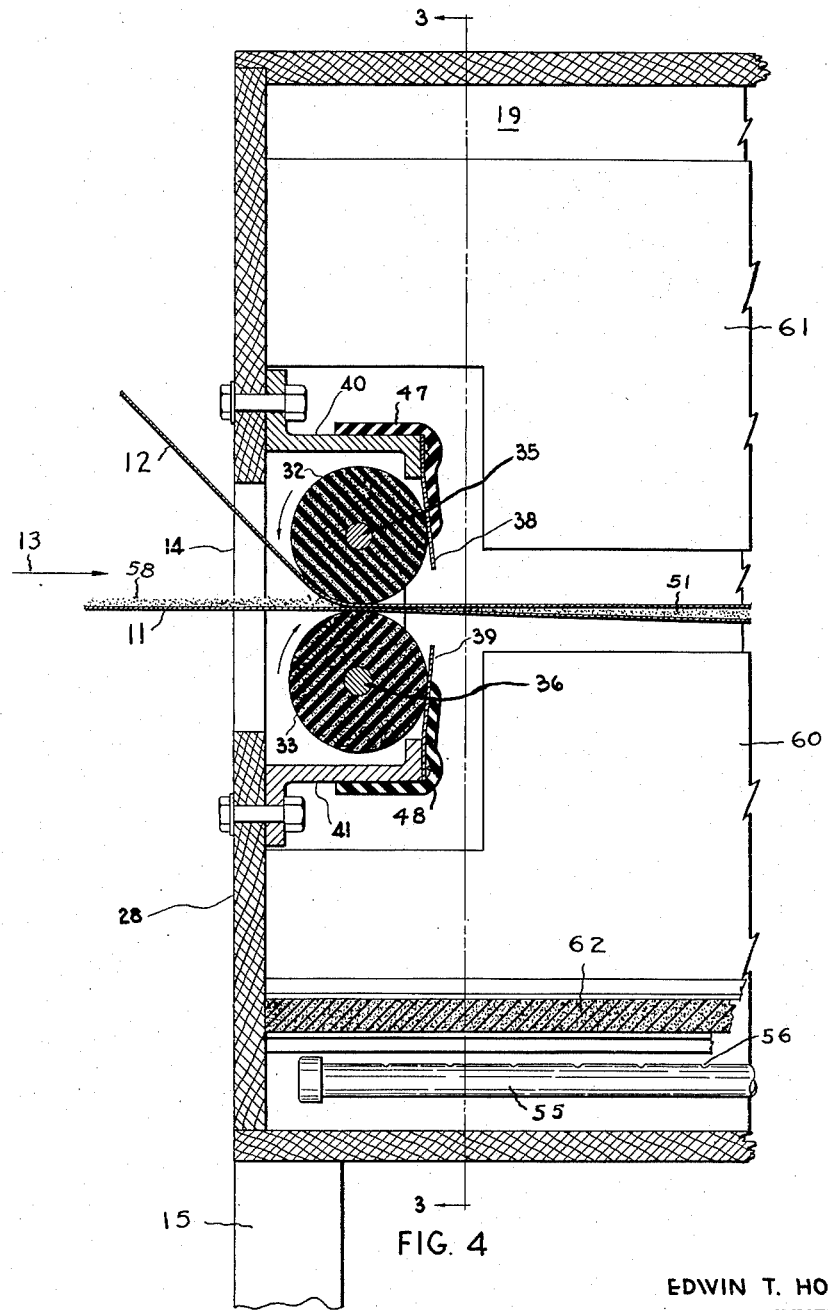
Figure 5:
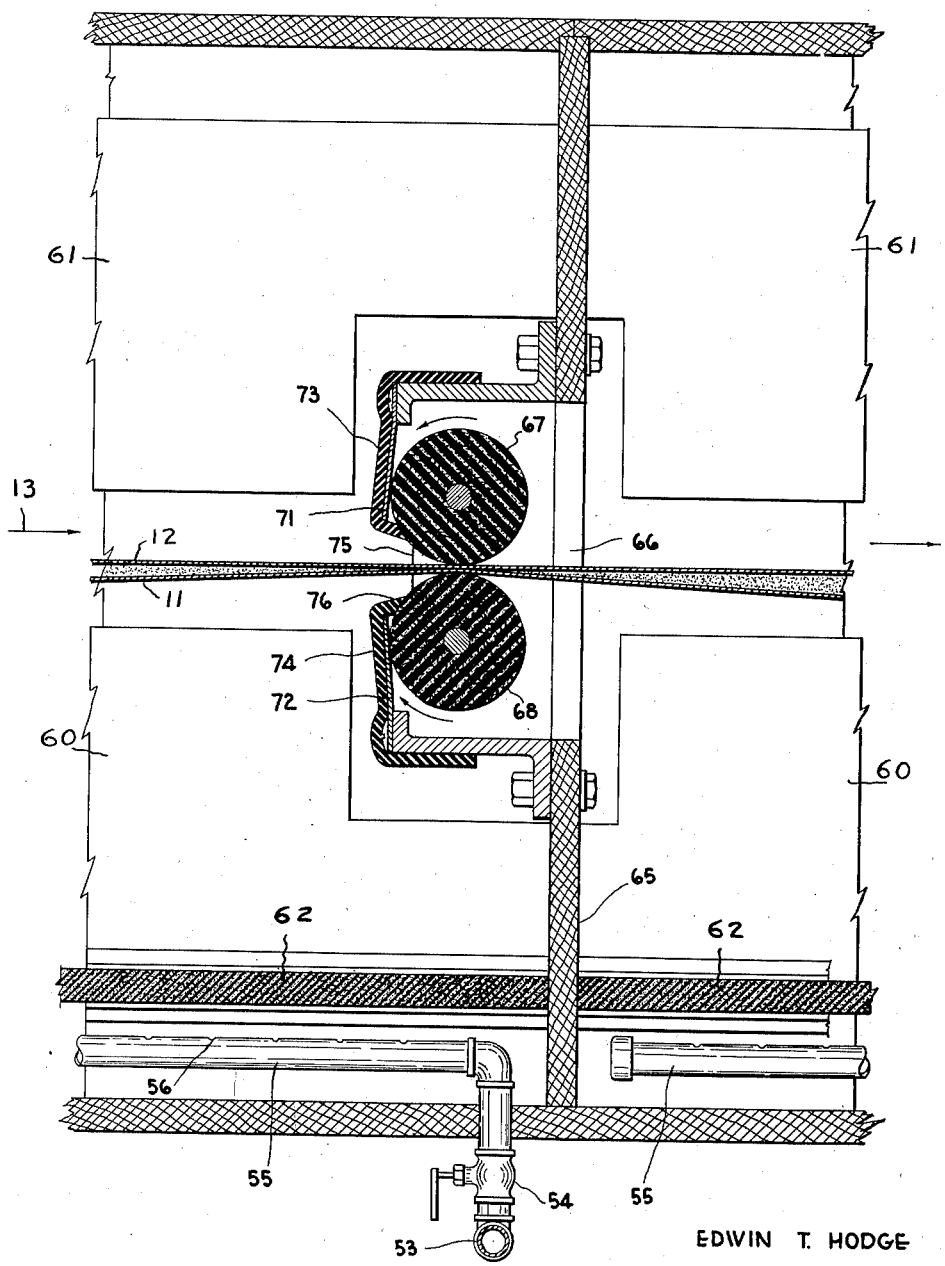

Referring to the drawings in Fig. 1 is shown a side elevation of a flax treating apparatus constructed in accordance with one form of the present invention; Fig. 2 is a fragmentary view in perspective illustrating the forward end of the apparatus shown in Fig. 1; Fig. 3 is a view taken along the line 3—3 of Fig. 4; Fig. 4 is a view taken along the line 4—4 of Fig. 3; Fig. 5 is a view similar to Fig. 4 but showing a wringer roll arrangement between adjacent tank receptacles; Fig. 6 is a sectional view taken along the line 6—6 of Fig. 3; and Fig. 7 is a sectional view taken along the line 7—7 of Figs. 3 and 6.

Referring to the drawings, in Fig. 1 is shown a flax treating apparatus comprising an elongated housing consisting of a tank 9 and a drier 10 arranged in an end to end relation and having a pair of longitudinal conveyor means or belts 11 and 12 extending lengthwise therethrough. It will become obvious as the description proceeds that it is not essential to the practice of the present invention that the drier 10 be arranged immediately adjacent the end of the tank 9 nor that the same conveyor belts 11 and 12 extend continuously through both of these units but that such arrangement is shown merely for convenience in the present instance. The tank 9 may be separated from the drier section 10 and each provided with its own conveyor means with provision for transferring the flax straw from the tank conveyor to the conveyor of the drier. As indicated in Fig. 1 the upper side of the lower belt 11 and the lower side of the upper belt 12 pass through an opening in the forward wall of the tank in the direction indicated by the arrow 13 and travel lengthwise through the tank and drier sections in a substantially straight horizontal line. Upon emerging from the rear end of the drier, the belt 12 returns over the top of the tank and drier assembly while the lower side of the belt 11 returns underneath the assembly. The tank and drier sections may be suitably supported upon upright members 15 while the belts 11 and 12 are adapted to be driven lengthwise through the tank and drier sections by means of a motor 16 through a suitable gear reduction device 17 and chain 18 connected to drive sprockets on the ends of roller supporting shafts as will be described more fully hereinafter.

The tank 9, in this instance, is shown as being subdivided into three chambers 19, 20, and 21, as indicated by the dotted lines in Fig. 1 but it is to be understood that the invention is not to be necessarily so limited in that it is contemplated that the tank may comprise a greater number of such chambers and which will be desirable in most instances. The chambers 19, 20 and 21 are substantially similar to each other so that it will be necessary to describe the internal structural arrangement of only one, such as the foremost one, 19.

In accordance with the present invention the chambers 19, 20 and 21 are filled with a suitable treatment fluid, such as water, and which is maintained substantially at the boiling point thereof by feeding live steam thereto such as through the steam line 22. Flax straw, which is spread out in a relatively thin layer upon the forward end of the lower belt 11 ahead of the tank, is carried through the successive chambers 19, 20 and 21 in a substantially straight horizontal line and, emerging from the last chamber 21, the straw passes through the drier 11 from which it emerges in a substantially dried condition in readiness for scutching.

It is explained that if flax straw were put loose into a receptable of boiling water, the water would penetrate into the straw particularly at the cut ends and upon dissolution of the pectic binder the free ends of the fiber bundles would swirl around in the water and in a very short period of time these fiber ends would become intertwined and matted together to such an extent that it would be a virtual impossibility to later separate them again. This condition would progress virtually as rapidly as the fibers would be freed from the shove and would be due largely to the agitation of the straw and the fibers by currents in the water. Also, if the straw is put into a tank of boiling water in a bundled form that straw toward the outside of the bundle would be treated to a much greater extent than that on the inside so that it would not be possible to obtain uniform treatment of the straw throughout the bundle. For reasons as explained above, the freed flax fiber on the outside of the bundle would become densely matted while the flax straw at the inside of the bundle would be treated and cleansed to only a very slight extent, if at all. In accordance with the present invention, the flax straw is uniformly and thoroughly treated in hot or boiling water or similar treatment fluid and in such a manner that matting of the flax fiber is precluded.

As shown more clearly in Fig. 2, the flax straw is spread out in a relatively thin layer upon the forward end of the conveyor 11 ahead of the treatment tank 9. The conveyors 11 and 12 are preferably of a width somewhat greater than the length of the straw and are of a liquid pervious material. As shown in the drawings, the conveyors 11 and 12 are of an open mesh fabric but it is to be understood, however, that the conveyors 11 and 12 may be formed of a plurality of spaced apart narrow belts either of fabric, reinforced rubber, wire, thin chain mesh or otherwise, the specific form being relatively immaterial so long as the conveyors do not hinder contact between the flax straw and the treatment fluid insofar as the present invention is concerned.

The foremost end of the lower belt 11 is trained about a suitable rotatably mounted roller 25 while the upper belt 12 is trained about a suitable rotatably mounted roller 26 positioned forwardly and above the front end of the tank 10. The belts 11 and 12 pass into the tank 10 through the elongated opening 27 in the forward wall 28 of the tank and into the liquid contained within the first chamber 19. Passage of liquid through the opening 27 is precluded by an arrangement of rollers which will be more fully described in connection with the sectional views of Figs. 3 and 4. Referring to these figures a pair of horizontally extending rollers 32 and 33 are shown journaled at their opposite ends in suitable bearings mounted on the tank side walls. The rollers 32 and 33 consist of a central metal supporting shaft 35 and 36, respectively, covered with a relatively thick cylinder of soft rubber or other similar material. The supporting shafts 35 and 36 project outwardly through one of the side walls of the tank and are geared together by intermeshing gears 37, as shown in Fig. 3, while one of the shafts is provided with a driving sprocket 38 about which is trained a chain 39 interconnecting various similar sprockets and through which the rollers are driven by the motor 16.

The rollers 32 and 33 are driven in such a direction as to draw the conveyor webs 11 and 12 therebetween, the rollers being so spaced that they compress tightly against the opposite sides of the conveyor webs and substantially preclude flow of liquid contained within the foremost tank chamber therebetween. Passage of liquid around the upper side of the upper roller 32 and beneath the lower roller 33 is precluded by resilient metal plates 38 and 39, respectively, secured along one side each to corresponding flanged supporting members 40 and 41 and which plates bear tangentially upon the surface of the corresponding roller with a resilient pressure.

Leakage of fluid past the opposite ends of the rollers 32, 33 is precluded by means of resilient end plates 42 as illustrated more clearly in the sectional views of Figs. 6 and 7. The end plates 42 are secured at their opposite side edges by screws 43 to the longitudinal flanged members 40 and 41. As viewed in Fig. 7, the lower edge of the plate 42 is provided with a right angularly extending flange portion 44 which is secured such as by bolts 45 to the tank wall 28. The plate 42 is crimped as shown at 46 adjacent the flange portion 44 and between its opposite ends in order to provide for resiliency and to cause the plate 42 to be urged with a spring action against the end faces of the rolls 32, 33. It will be understood that as the conveyor webs with the flax straw therebetween pass between the rolls, the rolls will tend to flatten between points of applied pressure and that they will experience a certain degree of endwise bulging. The spring plates 42 engaging with the ends of the rollers are designed so as to permit such endwise bulging of the rollers but without permitting any leakage between such plates and the rollers.

In order to prevent against leakage between the adjacent edges of the end plates 42 and the plates 38 and 39 bearing tangentially against the outer surfaces of the rollers 32 and 33, sealing members 47 and 48 of rubber or other similar material are cemented over the outer surfaces of the resilient plates 38, 39 and the opposite end plates 42. These sealing members will allow relative movements between the end plates 42 and the plates 38, 39 without permitting leakage therebetween past the rollers. In Fig. 6, the sealing member 48 is shown sectionalized for purposes of greater clarity in the drawings, it being understood that it is the same as the member 47.

The flax straw spread upon the lower conveyor web 11 in passing between the rollers 32, 33 will be compressed to a minimum thickness and the individual straws will be flattened and crushed to a certain extent thereby cracking the cortex thereof so as to permit more rapid absorption of the liquid within the tank as the straw is carried therethrough. In passing between the rollers and into the liquid within the chamber 19 the liquid will be freely absorbed by the straw due to the open mesh nature of the webs 11 and 12 and the webs are permitted to spread apart in accordance with the swelling of the straw by absorption of liquid as indicated at 51 in view of Fig. 4. In the present description the treating fluid contained within the various chambers of the tank 9 is referred to as consisting merely of heated water, that is water maintained substantially at the boiling point thereof but it is to be understood, however, that chemicals of various kinds may be included therein for facilitating the treatment and dissolution of the binder substances of the straw. Moreover, different chemicals may be employed in the water in different successive chambers, however, clear water may be provided in those chambers nearest the exit of the tank for rinsing and removing any chemicals which may have been used in the preceding chambers and which it is desired to be thoroughly removed from the flax straw before it is dried. Also, it is not essential that the treatment fluid be a liquid, inasmuch as it may be desirable to employ a gaseous treatment fluid in one or more of the chambers of the tank 9.

The conveyor webs 11 and 12 extend in a substantially straight horizontal line through the various chambers in the tank 9, passing from one chamber to the next through elongated openings in the separating walls and between pairs of cooperating compression rollers similar to those previously described. Throughout the passage through the tank, the individual flax straws will be retained between the conveyor webs in substantially the same relative position with respect to each other. The upper conveyor 12 is essential not only for preventing bunching of the straw as it passes between the compression rollers in the end walls of the respective chambers but also for preventing the straw from floating to the surface of the liquid within the successive chambers and for preventing the freed flax fibers from matting together.

As previously mentioned the water in each of the various chambers of the tank is maintained at a temperature of substantially 212° F. by supplying steam thereto through the pipe 22. The pipe 22 is connected to transversely extending headers 53 and which are in turn connected through valves 54 to a plurality of longitudinally extending pipes 55 arranged in the bottom of each of the successive chambers of the tank 9. The pipes 55 are provided with spaced perforations 56 throughout their length permitting escape of steam therefrom into the liquid within the chambers.

The flax straw is preferably laid out upon the conveyor web 11 with the butt ends extending along the same side of the conveyor web as indicated at 58 in Fig. 2 and which butt ends will require a somewhat higher temperature of liquid to effect uniformity of treatment of the straw throughout the full length thereof. Accordingly, by regulation of the valves 54 the amount of steam supplied to the various pipes 55 in the bottom of the tank may be controlled. By supplying a greater quantity of steam to one side of the tank than to the other the water at the butt ends of the straw may be maintained at a slightly higher temperature than the water at the narrow or tip ends of the straw. If necessary, the water in that side of the tank along which the butt ends of the straw are positioned may be supplied with an excess of live steam in order to effect uniformity of treatment throughout the length of the straw.

In order to facilitate the maintenance of higher temperature at one side of the tank than at the other a plurality of vertically arranged baffles 60 are provided in each of the chambers between each of the different pipes 55 as shown more clearly in the view of Fig. 3, the baffles 60 extending from the bottom wall of the chamber upwardly to a point relatively closely adjacent the lower conveyor web 11. Furthermore, a plurality of baffles 61 are arranged above the upper conveyor web 12 in alignment with the lower baffles 60. Arranged above the distributor pipes 55 between each pair of adjacent baffles 60 is a porous filter unit 62 which extends the full length of the corresponding chambers. These units 62 may consist of a section of Fiberglas board whereby the large bubbles of steam escaping from the perforations in the pipes 55 in passing therethrough are broken up into minute bubbles which in rising to the surface of the liquid create a minimum of agitation therein. It will be understood that if large bubbles of steam were permitted to rise through the liquid the flax straw between the conveyor webs would be subjected to more or less violent agitation and which would cause matting of the freed fibers of the straw and render scutching of the straw more difficult. It will be obvious that the units 62 may consist of any suitable material for breaking up the steam bubbles so as to minimize the agitation of the water through which the flax straw is carried by the conveyor webs.

As illustrated in Fig. 5, the walls 65 separating each of the respective chambers of the liquid treating tank 9 are provided with longitudinal openings 66 therethrough and a wringer roller assembly is provided adjacent thereto substantially similar to the wringer roller assembly as previously described. As shown in Fig. 5, the rollers 67 and 68 are mounted ahead of the wall 55. The rollers 67 and 68 are similar to the rollers 32 and 33 and are so arranged on opposite sides of the conveyors so that as the conveyor webs 11 and 12 with the straw therebetween pass therebetween the straw is wrung substantially free of water which has been absorbed thereby in passing through the preceding chamber. Impurities, various dissolved substances and reaction products are thus also removed from the straw with the water. As the absorbed water is compressed from the straw the side walls thereof are further broken open which facilitates the absorption of water into the straw in the next successive chamber. By this wringing and squeezing of the straw, coatings of reaction products are also eliminated so that additional reaction may take place in the next succeeding chamber without the impedance of a protective coating from the previous reaction.

The roller assembly 67, 68 is substantially similar to that previously described in connection with Fig. 4. Because of the fact that the rollers in this instance are mounted ahead of the supporting wall 65 the resilient metal plates 71 and 72 bearing tangentially against the surfaces of the corresponding rolls have their outer edges pointing in the same direction as the direction of rotation of the rolls. The rubber coverings 73 and 74 which are provided for sealing the corners between the plates 71, 72 and the end plates 75 may extend over the outermost edges of the plates 71 and 72 and may wipe against the surfaces of the rollers as indicated at 76. The flap portions 76 thus engaging with the surfaces of the rollers 67 and 68 also serve to prevent leakage around the upper and lower sides respectively of the corresponding rollers.

Roller assemblies similar to that last described are provided forwardly of each of the intermediate transverse walls between the respective chambers forming the tank 9 as well as forwardly of the rearmost wall of the tank for precluding passage of treatment fluid through the corresponding wall openings.

By the arrangement of wringer rollers between the successive chambers, passage of liquid from one chamber to the next is substantially precluded and cleansing of the straw is greatly facilitated thereby in that the straw is passed from one chamber to the next with the water in each successive chamber being cleaner and more free of impurities than the water in the preceding chamber.

The repeated wringing of the flax straw at the end of each of the successive liquid treatment chambers is an important factor of the present invention as regards both the method and the apparatus for it is by this process that the dissolved pectinous substances are removed from the straw together with other impurities and loose materials which are undesirable in the final product. By the arrangement of the pairs of wringer rollers in horizontal alignment with each other the flax straw itself is subjected to a minimum of agitation between the conveyor webs so as to minimize the tendency of the freed flax fibers from becoming entangled with each other which is important to the successful execution of the present invention.

Upon emerging from the last chamber 21 of the tank 9 the straw is passed directly into the drier 10 wherein the straw is dried to an extent sufficient for scutching. The details of the drier form no part of the present invention and may be of any suitable type. In the specific form shown the steam line 22 is connected to suitable heat exchangers (not shown) provided in the bottom of the drier and blower fans 80 and 81 are arranged beneath the drier 10 for circulating air through the heat exchangers and upwardly through the conveyor webs 11 and 12 and the straw therebetween. The air with the evaporated moisture picked up thereby may be discharged from the upper end of the drier through the vent openings 82. It is preferred that the temperature of the air circulated through the drier is above the boiling point of water in order to effect rapid removal of the water from the flax straw. I have discovered that flax straw after it has been treated in accordance with the present invention may be dried at temperatures ranging between 212° F. and 248° F. without causing any harmful effect upon the final product. Inasmuch as only heated air is circulated through the drier 10 and leakage of treatment fluid therefrom is not involved the supporting rolls for the conveyor webs 11 and 12 therein may be of any suitable form and need not be described in detail as was done in connection with the wringer roll arrangements provided in the treatment tank 9.

Inasmuch as the liquid within the successive treating chambers within the tank 9 is maintained at a temperature of substantially 212° F. and the flax straw emerging from the last chamber of the tank being heated to such a temperature it is important from the standpoint of efficiency that the straw be passed directly to the drier without any substantial cooling thereof taking place between the tank 9 and the drier 10. By heating the straw in the drier to a temperature above 212° F. the water will relatively rapidly be steamed off and the straw reduced to a suitably dried condition in a relatively short length of travel through the drier.

As illustrated in Fig. 1 the conveyor webs 11 and 12 are passed directly from the tank 9 through the drier 10, it being understood, however, that separate conveyor webs may be provided for carrying the flax straw through the drier if desired. In such instances, provision must be made for transferring the straw from one conveyor to the other but which may readily be designed by one skilled in the art. It is important, however, for reasons as mentioned above that the drier be arranged immediately adjacent the rear end of the tank 10 in order that the heat of the straw emerging from the last treatment chamber of the tank be not lost before it is passed into the drier. The straw upon emerging from the drier 11 may be removed by any suitable means from the conveyor.

Having described the invention in what is considered to be a preferred embodiment thereof, it is desired that it be understood that both the methods and the apparatus disclosed are subject to variation without departing from the spirit and scope of the invention.

What I claim is:

1. The method of treating fibrous straw which comprises passing the straw in a relatively thin layer in a relatively straight substantially horizontal line through a plurality of liquid filled receptacles, maintaining the temperature of the liquid in the receptacles substantially at the boiling point thereof, wringing and compressing the straw upon passage thereof from one receptacle to the next, passing said straw to a drier without substantially lowering the temperature of said straw emerging from the last of said receptacles, the straw being dried in said drier at a temperature above the temperature of the liquid in said receptacles.

2. The method of treating flax straw and the like materials which comprises passing the material in a relatively thin layer along a substantially straight horizontal line through a plurality of liquid filled receptacles, said material being arranged with the butt ends thereof all adjacent each other along one side of the path of travel of said material, holding said material submarged in said liquid in each of said receptaces, maintaining the temperature of the liquid in said receptacles adjacent the butt ends of the material at a slightly higher temperature than at the opposite end of said material, wringing and compressing the absorbed liquid and dissolved products from said material upon passage thereof from one of said receptacles to the next, and passing said material from the last of said receptacles to a drier without lowering the temperature thereof and drying said material at a temperature above the temperature of the liquid in any of said receptacles.

EDWIN T. HODGE.

REFERENCES CITED

The following references are of record in the file of this patent:

UNITED STATES PATENTS

| Number | Name | Date |
|---|---|---|
| 226,801 | Stephens | Apr. 20, 1880 |
| 412,887 | Lorimer | Oct. 15, 1889 |
| 467,493 | Best et al. | Jan. 26, 1892 |
| 535,665 | Boyle | Mar. 12, 1895 |
| 828,813 | Colahan | Aug. 14, 1906 |
| 899,440 | Shuman | Sept. 22, 1908 |
| 975,074 | Hobson | Nov. 8, 1910 |
| 1,158,245 | Lappen | Oct. 26, 1915 |
| 1,162,191 | Reichmawn | Nov. 30, 1915 |
| 1,181,553 | Taylor | May 2, 1916 |
| 1,315,698 | Bailey | Sept. 9, 1919 |
| 1,420,162 | Toles | June 20, 1922 |
| 1,729,772 | Forsyth | Oct. 1, 1929 |
| 1,914,599 | Hayes-Gratze | June 20, 1933 |
| 1,947,106 | Plumstead | Feb. 13, 1934 |
| 2,130,681 | Forsyth | Sept. 20, 1938 |
| 2,356,285 | Street | Aug. 22, 1944 |
| 2,366,136 | Waldstein | Dec. 26, 1944 |

FOREIGN PATENTS

| Number | Country | Date |
|---|---|---|
| 652,753 | Germany | Nov. 8, 1937 |
| 553,765 | Great Britain | June 4, 1943 |